United States Patent

[11] 3,617,651

[72] Inventor Robert C. Bell
East Setauket, N.Y.

[21] Appl. No. 849,283
[22] Filed Aug. 5, 1969
[45] Patented Nov. 2, 1971
[73] Assignee Beltronix Systems, Inc.

[54] DEVICE FOR RECORDING ON CARDBOARD AND LIKE MAGNETIC RECORD MEDIA
3 Claims, 2 Drawing Figs.

[52] U.S. Cl. .......... 179/100.2 R, 274/4 J
[51] Int. Cl. .......... G11b 5/78, G11b 15/60
[50] Field of Search .......... 179/100.2; 274/4 J; 35/35 C

[56] References Cited

UNITED STATES PATENTS

| | | | |
|---|---|---|---|
| 2,089,287 | 8/1937 | Molloy | 179/100.2 R |
| 2,508,485 | 5/1950 | Begun et al. | 179/100.2 R |
| 2,554,582 | 5/1951 | Mallina | 179/100.2 MI |
| 2,603,006 | 7/1952 | MacChesney et al. | 179/100.2 MI |
| 2,914,619 | 11/1959 | Sweeney et al. | 179/100.2 R |
| 3,050,225 | 8/1962 | Ulman | 179/100.2 R |
| 3,235,265 | 2/1966 | Morrison et al. | 179/100.2 R |
| 2,469,847 | 9/1969 | Kral | 179/100.2 R |

*Primary Examiner*—Bernard Konick
*Assistant Examiner*—Robert S. Tupper
*Attorneys*—William W. McDowell, Jr. and Kenneth E. Prince

ABSTRACT: Device for recording on a continuous, relatively stiff magnetizable record medium including a source of supply for said record medium, at least one magnetic transducer head, a bedplate having a radius of curvature essentially the same as the radius of curvature of the transducer heads and apertures accommodating each of the heads, means for reversely flexing the record medium before it enters its line of travel over the bedplate and means drawing the record medium from the supply source, over the flexing means, and across the bedplate and thus into close contact with the transducer heads. Optional features include supplementary auxiliary holddown means for the record medium in positions proximate to the transducer heads, photocell or like control means to actuate the transducer heads in sequence with predetermined portions of the record medium, and tension control means for regulating the tension of the record medium as it is fed to further processing stations.

INVENTOR
Robert C. Bell
BY William W. McDowell Jr.
ATTORNEY

DEVICE FOR RECORDING ON CARDBOARD AND LIKE MAGNETIC RECORD MEDIA

RECORDING DEVICE

The present invention relates to a recording device and more particularly to a device for accurately and fully recording (and, if desired, reproducing) magnetic information on a continuous web or strip of a relatively stiff record medium.

A magnetic transducer head for recording on and reproducing from a record medium comprises a closed magnetic circuit interrupted by a nonmagnetic gap to contact the record medium. During recordation, varying magnetic fields are produced in the gap which correspond to the electrical signals applied to the magnetic transducer head inducing corresponding residual magnetism on the record medium. During reproduction, the magnetic transducer will derive from the record medium an electrical signal corresponding to the remanent magnetic induction recorded during the recording process.

For contact recording, i.e., when the magnetic transducer head contacts the record medium during operation, it is desirable that the edges of the working gap of the magnetic transducer head make good and uniform contact with the record medium. In the case where a highly flexible, relatively limp plastic tape is used as the magnetic record medium, the tape can be easily flexed and/or pressed (with, e.g., a felt pad) to conform it to the contacting surface of the magnetic transducer head. But if a relatively stiff and relatively nonflexible record medium is used, since the transducer head itself is not flexible, it is usually necessary to change the position of the transducer head itself to conform it to the contacting surface of the record medium.

In recently granted U.S. Pat. No. 3,397,289 (Robert F. Pfost et al. — issued Aug. 13, 1968), the patentees have suggested the use of a "floating"X spring-loaded transducer head for use in recording on or reproducing from nonflexible record media such as metallic discs. While these patentees have disclosed one suitable means for solving the particular problems presented to them, the suggested solution is not readily adaptable for use in recording on continuous webs of record media and requires relatively expensive, intricate magnetic transducer head assemblies for establishing good contact between the head and the record medium.

The art needs a relatively simple, inexpensive means for magnetically recording on or reproducing from a continuous web of a relatively stiff record medium. Typical examples of such record media would be those in which the carrier web is cardboard paper; such as that used in preparing pay checks, various bills (e.g., gas and electric bills), inventory tags and the like; partially coated in selected areas with a layer of magnetizable material upon which desired information may be recorded for subsequent retrieval and data processing. For the purposes of the present invention the term "relatively stiff," as applied to record media to be processed in the recording device described Xand claimed herein, is intended to include those media which have a flexural rigidity approximately equal to or greater than the flexural rigidity of good to high-quality book-printing paper; as contrasted with the well-known, relatively limp, plastic recording tape media, e.g., those used in typical magnetic tape dictating machines.

It is an object of this invention to provide a device for recording on or reproducing from a continuous, relatively stiff record medium.

It is a specific object to provide a recording device in which good conformity between a magnetic transducer recording or reproducing head and a continuous, relatively stiff record medium so as to assure good recording and reproduction fidelity.

Still other objects and advantages will be apparent from the following more detailed description considered in connection with the accompanying drawing illustrating a presently preferred embodiment of the invention; it being understood that the drawing is presented for purposes of illustration and description only and is not intended as limiting the scope of the invention.

Figure 1:
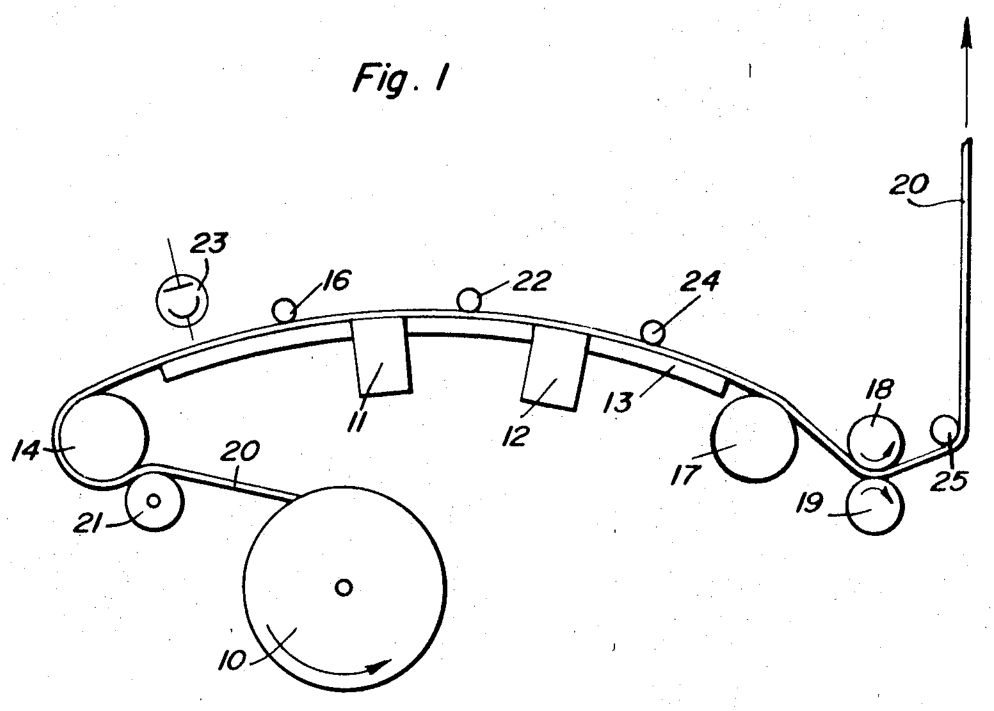
FIG. 1 is a schematic illustration of a front elevation of the presently preferred device of this invention.

The essential elements of the recording device of this invention, as illustrated in FIG. 1, include a source of supply such as reel 10 for the continuous record medium; at least one magnetic transducer head generally designated at 11 or 12; a bedplate 13 in which there are apertures accommodating each of the transducer heads; cylindrical rod means 14 adjacent to the supply feed end of the bedplate 13; and drawing means (including, as illustrated, rolls 18 and 19) for drawing the continuous web of the record medium (generally designated 20) from the supply reel 10 or other supply source, over the rod means 14, and thence over the bedplate 13.

As optional preferred features the device may, but need not necessarily, include rotatable roll 21 cooperating with rod means 14, a second cylindrical rod means 17 (usually like the rod means 14) adjacent the exit end of the bedplate 13 and holddown means such as the spherical balls 16, 22 and 24 urging the record medium 20 into close conformity with the bed plate 13 and thus into close conformity with the transducer heads 12 as it travels. The balls 16, 22 and 24 are typically urged toward the bedplate 13 by means such as spring means (not shown). Alternate constructions could include spring-loaded round-nosed bullet-shaped elements (not shown) instead of the spherical balls 16, 22 and 24, or fingers or rotatable rollers (not shown) extending across the width of the record medium in place of the point contact balls or bullet-shaped elements.

Another optional feature in the presently preferred embodiment of the present invention is an actuating means such as photocell 23 appropriately located over the record medium 20 as it commences its travel across the bedplate. The actuating means acts in response to indicia or the like on the record medium and, through suitable standard circuitry (not illustrated), activates the transducer heads 11 and 12 at the proper time and in proper sequence. The device may also include tension-regulating means acting in response to deflection or pressure on the guide roll 25 or equivalent element such as a spring strip. If the feed to subsequent processing stations (e.g., cutting, mechanical printing, etc.) is too fast the tension in the strip 20 will be reflected by increased pressure on the means 25. At predetermined or preset maximum pressure a control circuit (not shown) is set into action to stop feed to the subsequent processing stations. The draw rolls 18 and 19 will continue to feed the strip through the recorder device until tension is again proper at which time the control circuit causes recommencement of feed to subsequent processing stations.

It is essential for purposes of the present invention that the radius of curvature of the upper surface of bedplate 13 is essentially the same as the radius of curvature of the upper recording or reproducing surfaces of the magnetic transducer heads 11 or 12. It is also essential that the relatively stiff record medium be reversely flexed around the outer surface of rod means 14 before it is drawn over the bedplate 13. To be sure that this reverse flexing is properly accomplished the record medium must travel over at least a 60° arc sector of the outer surface of the rod 14. This is readily accomplished by suitably positioning the supply reel 10 or other supply source. It has been observed that this combination of essential features as described is the only effective way of assuring good contact between the heads and the record medium drawn thereover. To further aid in attaining good contact it is preferred to position the nip of draw rolls 18 and 19 at least slightly inside or below the imaginary continuation of the radius of curvature of the bedplate 13 so that the line of travel of the record medium is downwardly between the end of the bedplate and the draw rolls 18 and 19.

Additional nonessential features in the presently preferred embodiment as illustrated include cylindrical rod means 17 and presser roll 21. The former aids in preventing tearing, scratching, scuffing or otherwise physically damaging the record medium as it is drawn downwardly over the exit end of the bedplate 13. The presser roll 21, which preferably includes an outer rubber covering, assists in assuring good lateral contact of the record medium 20 with the outer surface of rod means 14 as the former is reversely flexed over the latter. The rotating roll 21 may be freely rotatable or positively driven if desired to assist in feeding the record medium 20 through the recording device. In the latter event the roll 21 must not rotate at a linear speed faster than the linear speed of the record medium due to the drawing means 18 and 19 and preferably is driven, if at all, at a much lower linear speed.

The rod means 14 and 16 (and 17, if included) may be fixed or freely rotatable as desired. In any event, these rod means are not positively driven. At least one of the draw rolls 18 and 19 must be driven and both may be if desired. If only one (e.g., 19) is positively driven, the other (e.g., 18) must, of course, be urged into contact with the driven roll.

For best results the diameter of cylindrical rod means 14 is at least about 25 times, and preferably about 50 to 100 times, the thickness of the relatively stiff record medium 20 to be reversely flexed by the rod means. The size of rod means 17 is not critical. Usually the rod means 17 will be a duplicate of rod means 14.

Figure 2:
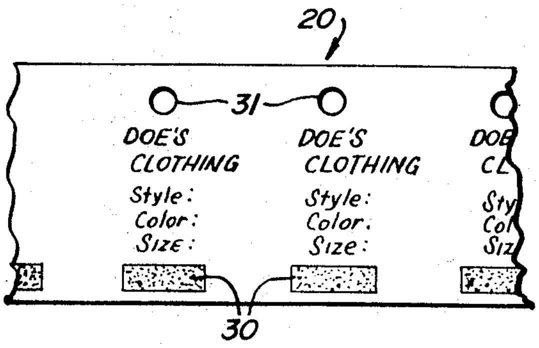
FIG. 2 is a schematic illustration of one type of record medium which can be used in the device of FIG. 1.

FIG. 2 schematically illustrates one type of record medium within the contemplated uses of the recording device of this invention. As shown, this includes a cardboard web having a flexural rigidity approximately equal to that of a typical Government employee's paycheck and intended for use in preparing inventory and sales tags. The web is at least about 1 inch wide and may have a width of up to 5 inches or more. At periodic intervals the web is coated with a layer of magnetizable material 30 upon which desired data is recorded for sales and inventory purposes. If desired, this coating could be a continuous stripe on the web 20. The individual tag portions include (or are later mechanically printed to include) the usual printing for ocular inspection by the customer and/or salesperson and where desired, openings 31 for securing the tag to the goods until sold by means of a string or other suitable securing means. These openings 31 may also conveniently serve to "-trigger" the transducer heads through appropriate circuitry actuated by the photocell 23. After the desired data is recorded on the magnetic record receiving areas 30 in the illustrated device, the cardboard web is printed (if not already printed) and cut laterally at proper intervals to form a plurality of sales tags for attachment to the proper goods. When the goods are sold the salesperson merely reproduces the data recorded on portions 30 thereof in a suitable reproducing device (not shown or described herein). The data is then electronically recorded for desired further data processing, e.g., for compilation of total sales volume, for inventory control and where desired reordering of new goods, etc.

It is believed that operation of the recording device will be clearly apparent from the above description. Briefly, record medium 20 is drawn off of reel 10, reversely flexed around rod means 14, travels beneath photocell 23 and over plate 13 and the recording head 11 where data is recorded on portions 30, and drawn off by drawing means 18 and 19 from whence Xit is fed to desired further processing stations (e.g., printing stations, severing stations, etc.). In the illustrated device transducer head 12 has been included as a reproducing head which reads the data recorded by head 11. This is "doublechecked" in suitable electronic data processing equipment (not shown or described herein) to assure that the information recorded by head 11 is correct and accurate.

While the invention has been described in connection with one of its presently preferred embodiments, it will be understood that there may be many variations therein or modifications thereof within the scope of the appended claims.

What is claimed is:

1. Device for recording on a continuous length of cardboard or like stock having flexural rigidity equal to or greater than the flexural rigidity of good quality book printing paper and at least partially coated in the intended record area with a layer of magnetizable record material comprising:

a. a source of supply for said continuous length of cardboard stock;
b. at least one magnetic transducer head located in fixed position where it will contact said layer of record material;
c. a flat-surfaced bedplate in the line of travel of said record medium; said bedplate having an aperture to accommodate each of said transducer heads and having a radius of curvature which is essentially the same as the radius of curvature of the recording portion of said heads;
d. a first cylindrical rod means between said source of supply for said cardboard stock and said bedplate and positioned so as to reversely flex said continuous stock through an arc of at least 60° prior to traveling across said bedplate; said rod means having a diameter at least 25 times the thickness of the cardboard stock; and
e. means at the opposite end of the bedplate and located at least slightly inside the imaginary continuation of the radius of curvature of said bedplate for drawing said cardboard stock from said source of supply, over said first cylindrical rod means, and over said bedplate.

2. Device as defined in claim 1 including means for resiliently pressing said record medium against the surface of said first cylindrical rod means.

3. Device as defined in claim 1 including second cylindrical rod means at the exit end of the bedplate and located on or slightly outside of the imaginary continuation of the radius of curvature of said bedplate.

* * * * *